US012780174B2

(12) United States Patent
Harrison et al.

(10) Patent No.: US 12,780,174 B2
(45) Date of Patent: Nov. 3, 2026

(54) CONTROL OF HYBRID VEHICLE ENGINE IDLING TORQUE

(71) Applicant: Jaguar Land Rover Limited, Whitley (GB)

(72) Inventors: Alex Harrison, Coventry (GB); Matt Sullivan, Coventry (GB); Andy Jones, Whitley (GB)

(73) Assignee: Jaguar Land Rover Limited, Whitley (GB)

( * ) Notice: Subject to any disclaimer, the term of this patent is extended or adjusted under 35 U.S.C. 154(b) by 0 days.

(21) Appl. No.: 18/876,183

(22) PCT Filed: Jun. 12, 2023

(86) PCT No.: PCT/EP2023/065653
§ 371 (c)(1),
(2) Date: Dec. 17, 2024

(87) PCT Pub. No.: WO2023/242121
PCT Pub. Date: Dec. 21, 2023

(65) Prior Publication Data

US 2025/0368179 A1 Dec. 4, 2025

(30) Foreign Application Priority Data

Jun. 17, 2022 (GB) ..................................... 2208921

(51) Int. Cl.
*B60W 20/00* (2016.01)
*B60W 10/06* (2006.01)
(Continued)

(52) U.S. Cl.
CPC ............ *B60W 20/13* (2016.01); *B60W 10/06* (2013.01); *B60W 10/08* (2013.01);
(Continued)

(58) Field of Classification Search
CPC ...... B60W 20/13; B60W 10/06; B60W 10/08; B60W 2510/0642; B60W 2510/0657;
(Continued)

(56) References Cited

U.S. PATENT DOCUMENTS

2007/0000703 A1* 1/2007 Hughes ................. B60W 10/26
180/65.265
2010/0038158 A1* 2/2010 Whitney ................ B60K 6/365
180/65.265
(Continued)

FOREIGN PATENT DOCUMENTS

CN 111301182 A * 6/2020 ............... B60K 6/48
CN 110920603 B 7/2020
(Continued)

OTHER PUBLICATIONS

International Search Report and Written Opinion corresponding to application PCT/EP2023/065653, dated Sep. 11, 2023, 14 pages.
(Continued)

*Primary Examiner* — Peter D Nolan
*Assistant Examiner* — Peter Y Ning
(74) *Attorney, Agent, or Firm* — TROUTMAN PEPPER LOCKE LLP; Dustin B. Weeks; Nicholas H. Doss

(57) ABSTRACT

A control system (200), a method (600), and computer software (208) for controlling an engine (102) and an electric machine (106) of a vehicle (1). The method (600) comprises: receiving (606) a first input signal indicative of an engine idle torque requirement ($T_A$) during engine idling; comparing (610) an instantaneous torque requirement ($T_A$ or $T_A+T_B$) with a reference engine idling torque ($T_C$) associated with use of a base ignition retardation value; and outputting a control signal (612, 616, 618) to control output torque of the engine in dependence on the comparison, wherein if the instantaneous torque requirement ($T_A$ or
(Continued)

$T_A+T_B$) is less than the reference engine idling torque ($T_C$), the control signal requests (612) the reference engine idling torque ($T_C$) with the base ignition retardation value, and the control system is configured to control the electric machine (106) to impose a retarding torque on the engine (102) to generate electrical energy, thereby reducing a net torque.

14 Claims, 3 Drawing Sheets

(51) Int. Cl.
*B60W 10/08* (2006.01)
*B60W 20/13* (2016.01)

(52) U.S. Cl.
CPC ............... *B60W 2510/0642* (2013.01); *B60W 2510/0657* (2013.01); *B60W 2510/083* (2013.01); *B60W 2710/0644* (2013.01); *B60W 2710/0666* (2013.01); *B60W 2710/083* (2013.01)

(58) Field of Classification Search
CPC ... B60W 2510/083; B60W 2710/0644; B60W 2710/0666; B60W 2710/083; B60W 2510/0628; B60W 2510/081; B60W 30/1882; B60W 40/00; B60W 50/038; B60W 20/50; B60W 30/18063; B60W 20/17; B60W 10/30; B60W 2030/206; B60W 2510/0638; B60W 2510/305; B60W 2555/20; B60W 2710/081; B60W 10/26; B60W 20/11; B60W 20/10; B60W 20/16; B60W 2710/065; Y02T 10/62; B60K 6/48; B60K 6/485; B60K 6/20
See application file for complete search history.

(56) References Cited

U.S. PATENT DOCUMENTS

| | | | | |
|---|---|---|---|---|
| 2017/0349163 | A1* | 12/2017 | Kim | B60L 58/13 |
| 2018/0030908 | A1* | 2/2018 | Pursifull | F02D 35/023 |
| 2023/0159016 | A1* | 5/2023 | Hancock | B60K 6/448 701/22 |
| 2023/0347863 | A1* | 11/2023 | Idogawa | B60W 20/10 |

FOREIGN PATENT DOCUMENTS

| | | | | | |
|---|---|---|---|---|---|
| DE | 102019202238 | A1 | * | 8/2020 | B60W 10/08 |
| GB | 2590959 | A | | 7/2021 | |
| JP | 2004027998 | A | | 1/2004 | |
| JP | 2005201197 | A | | 7/2005 | |
| JP | 2016113946 | A | | 6/2016 | |
| JP | 2019059413 | A | | 4/2019 | |
| JP | 2023180934 | A | * | 12/2023 | |
| KR | 101826674 | B1 | | 2/2018 | |

OTHER PUBLICATIONS

Great Britain Combined Search and Examination Report corresponding to application GB2208921.3, 7 pages.

* cited by examiner

CONTROL OF HYBRID VEHICLE ENGINE IDLING TORQUE

TECHNICAL FIELD

The present disclosure relates to the control of hybrid vehicle engine idling torque. In particular, but not exclusively it relates to a control system, a method, and computer software for controlling hybrid vehicle engine idling torque, the vehicle comprising an internal combustion engine and an electric machine.

BACKGROUND

Hybrid electric vehicles comprise an internal combustion engine ('engine') and an electric machine. The engine and electric machine may be capable of outputting positive torque to increase tractive force of the vehicle. The electric machine may further be capable of imposing a negative torque (charging torque) to generate electrical energy which can be stored and used. In some operating scenarios, energy may be converted by operating the engine to output positive torque while operating the electric machine as a generator to convert the torque from the engine into electrical energy for storage.

Engines are less thermally efficient than electric machines. The thermal efficiency of an engine is generally increased when the timing of ignition of a fuel-air charge is advanced, so that ignition occurs earlier with respect to an intake valve opening time. It follows that if the ignition timing is retarded (opposite of advancing), the thermal efficiency is decreased. Most engine control systems implement some form of ignition timing map.

It is known to implement an ignition timing 'torque reserve' during engine idling, meaning that the ignition timing is not at its most advanced state or most retarded state. Although this is not the most efficient manner of controlling an engine, rapid deviations in engine speed from an engine idle speed setpoint can be compensated near-instantly by controlling ignition timing, whereas other more thermally-efficient means of controlling engine torque are generally too slow to ensure smooth engine idling.

It is an aim of the present invention to address one or more of the disadvantages associated with the prior art.

SUMMARY OF THE INVENTION

Aspects and embodiments of the invention provide a control system, a vehicle, a method, and computer software, as claimed in the appended claims.

According to an aspect of the invention there is provided a control system for controlling an engine and an electric machine of a vehicle, the control system comprising one or more controllers, the control system configured to:

- receive a first input signal indicative of an engine idle torque requirement during engine idling;
- compare an instantaneous torque requirement with a reference engine idling torque associated with use of a base ignition retardation value; and
- output a control signal to control output torque of the engine in dependence on the comparison, wherein if the instantaneous torque requirement is less than the reference engine idling torque, the control signal requests the reference engine idling torque with the base ignition retardation value, and the control system is configured to control the electric machine to impose a retarding torque on the engine to generate electrical energy, thereby reducing a net torque.

An advantage is improving vehicle efficiency, by reducing or eliminating the need for ignition retardation during engine idling to provide a torque reserve. When certain conditions are met, the base ignition retardation value becomes the new baseline timing (as opposed to a torque reserve ignition timing value). This enables the engine to be controlled at its most thermally efficient operating point during engine idling. Since use of the more thermally efficient base ignition retardation value will often result in engine output torque being too high compared to what is actually needed for engine idle speed control, the electric machine will be controlled to impose a braking/retarding torque by converting the excess engine output torque into electrical energy stored in the electrical energy storage means. Therefore, engine idle speed can be maintained, without wasting energy, by operating the engine with higher thermal efficiency and by converting the resulting excess engine output torque into stored electrical energy.

In some examples, the control system is configured to receive a second input signal indicative of an electric machine torque requirement during the engine idling, and wherein the instantaneous torque requirement is based on the first input signal and the second input signal.

The instantaneous torque requirement may be based on a sum of the first input signal and the second input signal.

In some examples, the base ignition retardation value is zero degrees of ignition retardation. However, the skilled person would understand that a few degrees of ignition retardation (up to five degrees) does not meaningfully reduce thermal efficiency. Therefore, in some examples, the base ignition retardation value is a value selected from the range zero to five degrees of ignition retardation.

In some examples, the reference engine idling torque is a minimum idling torque achievable with use of the base ignition retardation value. In some examples, the reference engine idling torque is a minimum idling torque achievable with use of a minimum engine air charge and the base ignition retardation value.

In some examples, the reference engine idling torque is a modelled value based on in-vehicle sensor data. In some examples, the modelled value is from an engine airflow model, and wherein the in-vehicle sensor data comprises engine airflow measurements.

In some examples, if the instantaneous torque requirement is greater than the reference engine idling torque, the control signal requests more than the reference engine idling torque. In some examples, requesting more torque than the reference engine idling torque comprises requesting the instantaneous torque requirement. In some examples, requesting more torque than the reference engine idling torque comprises requesting the instantaneous torque requirement with the base ignition retardation value.

In some examples, requesting more torque than the reference engine idling torque comprises requesting the instantaneous torque requirement if a condition is satisfied. In some examples, the condition is a noise vibration and harshness condition (NVH). In some examples, the NVH condition comprises a noise vibration and harshness (NVH) torque limit. In some examples, the NVH torque limit is dependent on engine speed and/or wherein the NVH torque limit is dependent on an engine mode. In some examples, if the instantaneous torque requirement exceeds the NVH torque limit, the control signal to control output torque of the engine is modified towards the NVH torque limit.

An advantage is that NVH is reduced or minimised during engine idling.

In some examples, the one or more controllers collectively comprise:

at least one electronic processor having an electrical input for receiving the input signal(s); and at least one memory device electrically coupled to the at least one electronic processor and having instructions stored therein;

and wherein the at least one electronic processor is configured to access the at least one memory device and execute the instructions thereon so as to cause execution of the comparison of the instantaneous torque requirement with the reference engine idling torque.

According to another aspect of the invention there is provided a vehicle comprising the control system of any preceding claim.

According to a further aspect of the invention there is provided computer software that, when executed, is arranged to perform any one or more of the methods described herein. According to a further aspect of the invention there is provided a non-transitory computer readable medium comprising computer readable instructions that, when executed by one or more electronic processors, causes the one or more electronic processors to carry out any one or more of the methods described herein.

According to another aspect of the invention there is provided a method of controlling an engine and an electric machine of a vehicle, the method comprising:

receiving a first input signal indicative of an engine idle torque requirement during engine idling;

comparing an instantaneous torque requirement with a reference engine idling torque associated with use of a base ignition retardation value; and outputting a control signal to control output torque of the engine in dependence on the comparison, wherein if the instantaneous torque requirement is less than the reference engine idling torque, the control signal requests the reference engine idling torque with the base ignition retardation value, and the control system is configured to control the electric machine to impose a retarding torque on the engine to generate electrical energy, thereby reducing a net torque.

According to another aspect of the invention there is provided a control system for controlling an engine and an electric machine of a vehicle, the control system comprising one or more controllers, the control system configured to:

receive a first input signal indicative of an engine idle torque requirement during engine idling;

determine whether the engine idle torque requirement exceeds a noise vibration and harshness (NVH) torque limit; and output a control signal to control output torque of the engine in dependence on the first input signal and on the determination, wherein if the engine idle torque requirement exceeds the NVH torque limit the control signal is modified towards the NVH torque limit.

According to another aspect of the invention there is provided a control system for controlling an engine and an electric machine of a vehicle, the control system comprising one or more controllers, the control system configured to:

receive a first input signal indicative of an engine idle torque requirement during engine idling;

compare an instantaneous torque requirement with a reference engine idling torque associated with use of a base ignition retardation value, wherein the reference engine idling torque is a modelled value based on in-vehicle sensor data; and output a control signal to control output torque of the engine in dependence on the first input signal and on the comparison.

Within the scope of this application it is expressly intended that the various aspects, embodiments, examples and alternatives set out in the preceding paragraphs, in the claims and/or in the following description and drawings, and in particular the individual features thereof, may be taken independently or in any combination that falls within the scope of the appended claims. That is, all embodiments and/or features of any embodiment can be combined in any way and/or combination that falls within the scope of the appended claims, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
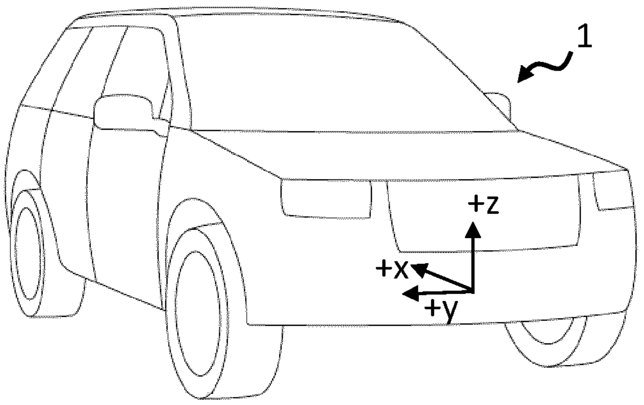
FIG. 1 illustrates an example of a vehicle.

FIG. 1 illustrates an example of a vehicle 1 in which embodiments of the invention can be implemented. In some, but not necessarily all examples, the vehicle 1 is a passenger vehicle, also referred to as a passenger car or as an automobile. In other examples, embodiments of the invention can be implemented for other applications, such as commercial vehicles.

FIG. 1 is a front perspective view and illustrates a longitudinal x-axis between the front and rear of the vehicle 1 representing a centreline, an orthogonal lateral y-axis between left and right lateral sides of the vehicle, and a vertical z-axis. A forward/fore direction typically faced by a driver's seat is in the negative x-direction; rearward/aft is +x. A rightward direction as seen from the driver's seat is in the positive y-direction; leftward is-y. These are a first lateral direction and a second lateral direction.

Figure 2:
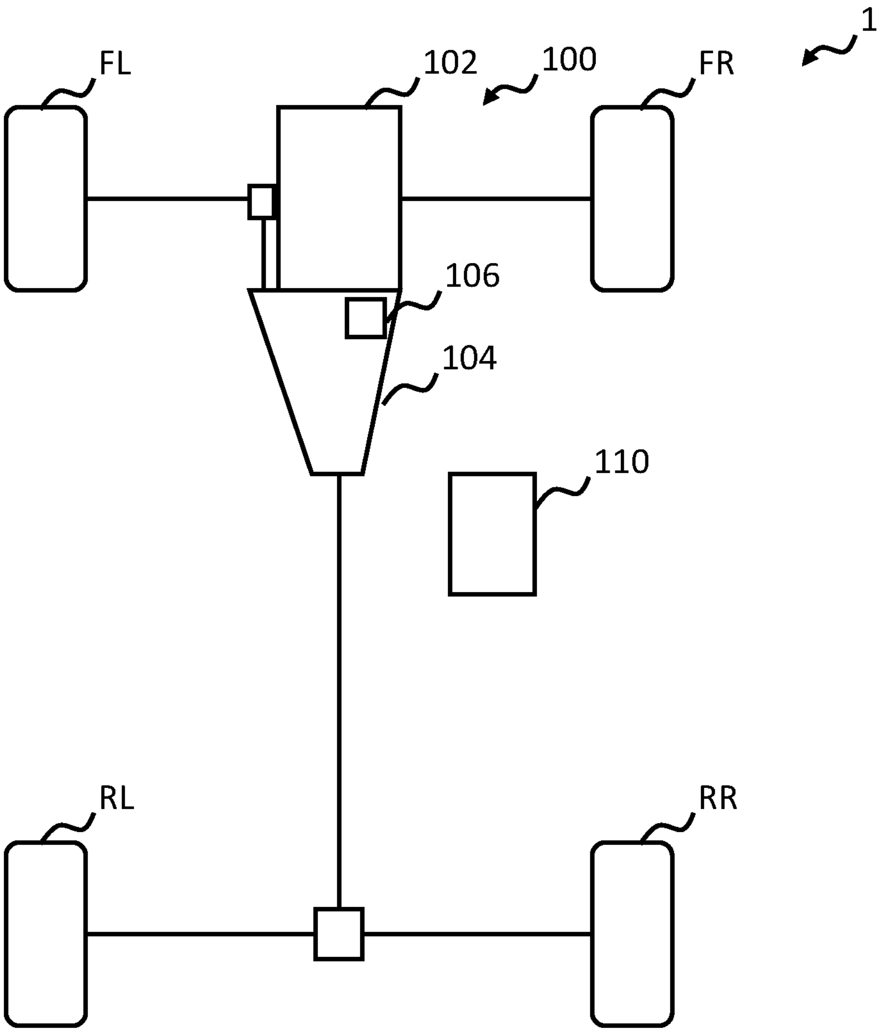
FIG. 2 illustrates an example of a vehicle powertrain architecture.

FIG. 2 schematically illustrates an example of powertrain 100 of the vehicle 1. The illustrated powertrain 100 comprises an internal combustion engine 102 ("engine") and an electric machine 106. The invention is not limited to the specific layout shown.

The vehicle 1 is a hybrid electric vehicle (HEV). The vehicle 1 may be a full HEV or a mild HEV. Full HEVs have an electric-only mode of propulsion. Mild HEVs do not have an electric-only mode of propulsion, but the electric machine 106 may be configured to provide assistance such as boosting output torque of the engine 102.

The illustrated powertrain 100 is a parallel HEV powertrain. A parallel HEV powertrain comprises a torque path between the engine 102 and at least one vehicle wheel FL, FR, RL, RR, as well as a torque path between an electric machine 106 and at least one vehicle wheel FL, FR, RL, RR. The torque path(s) may be disconnectable by a torque path connector such as a clutch.

Parallel HEVs differ from series HEVs, because in series HEVs the purpose of the engine is to generate electrical energy and there is no torque path between the engine and vehicle wheels FL, FR, RL, RR.

Figure 3:
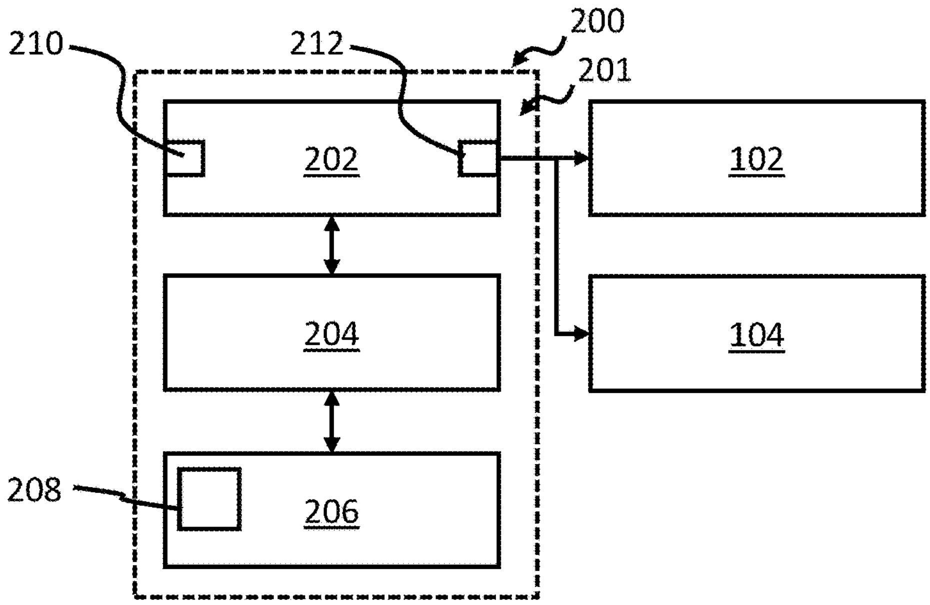
FIG. 3 illustrates an example of a control system.

The engine 102 and electric machine 106 are operably coupled to a control system 200 shown in FIG. 3, to enable the control system 200 to control output torque of the engine 102 and electric machine 106. The control system 200 is operable to control the output torque of the engine 102 by changing variables such as ignition timing and many other variables which are outside the scope of this disclosure.

The control of ignition timing depends on the type of engine. If the engine 102 is configured for spark ignition, the control system 200 can vary the ignition timing by controlling spark plug firing timing relative to an engine rotation angle. If the engine 102 is configured for compression ignition, the control system 200 can vary the ignition timing by controlling fuel injection timing relative to a crank angle (crankshaft angular position).

The powertrain 100 comprises a transmission 104 for receiving output torque from the engine 102. The transmission 104 may comprise an automatic vehicle transmission, a manual vehicle transmission, or a semi-automatic vehicle transmission. The transmission 104 may comprise one or more friction clutches and/or a torque converter, between the engine 102 and a gear train.

The powertrain 100 comprises an electric machine 106. The electric machine 106 may be an alternating current induction motor or a permanent magnet motor, or another type of motor. The electric machine 106 is powered by an electrical energy storage means 110 such as a traction battery.

The electric machine 106 is operable as a motor and as a generator to apply positive and negative torque, controlling the net torque of the powertrain 100 as measured at the torque path connector (e.g., clutch). In a generation mode, the electric machine 106 can generate electricity for charging an electrical energy storage means 110. In a motor mode, the electric machine 106 can increase the tractive force of the vehicle 1.

The electric machine 106 may be at any appropriate location that enables output torque of the electric machine 106 to accelerate or decelerate a crankshaft of the engine 102, regardless of whether the engine 102 is connected to or disconnected from the driven vehicle wheels FL, FR, RL, RR. For example, the electric machine 106 may be upstream of the torque path connector.

FIG. 3 illustrates an example control system 200 configured to implement one or more aspects of the invention. The control system 200 of FIG. 2 comprises a controller 201. In other examples, the control system 200 may comprise a plurality of controllers on-board and/or off-board the vehicle 1.

The controller 201 of FIG. 2 includes at least one processor 204; and at least one memory device 206 electrically coupled to the electronic processor 204 and having instructions (e.g. a computer program 208) stored therein, the at least one memory device 206 and the instructions configured to, with the at least one processor 204, cause any one or more of the methods described herein to be performed.

The controller 201 may have an interface 202 comprising an electrical input/output I/O 210, 212, or an electrical input 210, or an electrical output 212.

The electrical input 210 is for receiving any input signals relevant to the methods described herein. The electrical output 212 is for outputting control signals (directly or indirectly) to external actuators such as the engine 102 and the electric machine 106.

The control system can convert torque requirements into individual control signals for modifying variables such as engine ignition timing, electric machine 106 torque, etc.

Figure 4:
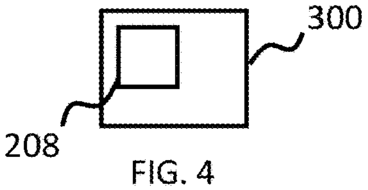
FIG. 4 illustrates an example of a non-transitory computer-readable storage medium.

FIG. 4 illustrates a non-transitory computer-readable storage medium 300 comprising the instructions (computer software).

Figure 5:
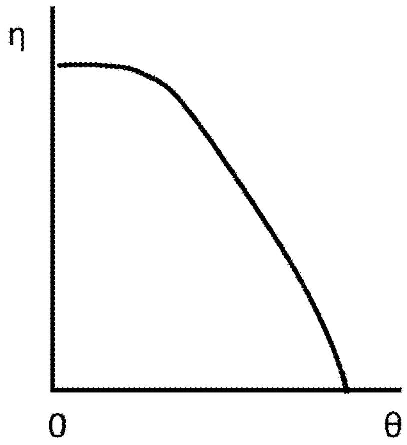
FIG. 5 illustrates an example ignition timing efficiency graph

To provide background on ignition timing, FIG. 5 is included. FIG. 5 is a graph illustrating relative thermal efficiency (y-axis, n) of the engine 102 with respect to ignition timing (x-axis, 0) with respect to the crank angle. As ignition timing is advanced towards the left of the graph, ignition starts earlier and before engine top dead centre. As ignition timing is retarded towards the right of the graph, ignition starts later and may start after engine top dead centre.

As shown in FIG. 5, thermal efficiency is highest when the ignition retardation is zero relative to a maximum ignition advance selectable by the control system 200. The maximum ignition advance is dependent on engine calibration. Knock protection is the most significant factor controlling how far the ignition timing can be advanced. There is an equivalent limit on how retarded the ignition can be, based on combustion stability/misfire.

As shown in FIG. 5, a few degrees of initial ignition retardation (up to approximately 5 degrees) does not substantially decrease thermal efficiency, as shown by the plateau. However, thermal efficiency then decreases at an increasing rate as the ignition retardation is further increased.

The term 'base ignition retardation value' (or 'base spark') as used herein refers to a minimum level of ignition retardation corresponding to zero or near-zero degrees of ignition retardation from the maximum ignition advance. Therefore, the highest thermal efficiency is attainable when the control system 200 implements the base ignition retardation value. Note, the skilled person would understand that a few degrees of ignition retardation (up to five degrees) does not meaningfully reduce thermal efficiency, therefore the term 'base ignition retardation value' as used herein applies generally to 0-5 degrees of ignition retardation.

The ability of the control system 200 to control ignition timing to control thermal efficiency, and therefore engine output torque, has various uses. Ignition timing control is a popular method of implementing engine idle speed control. This is because rapid deviations in engine speed from an engine idle speed setpoint can be smoothed near-instantly by controlling ignition timing, whereas other more thermally efficient means of controlling engine torque are generally too slow to ensure smooth engine idling.

The term 'torque reserve' refers to the established practice of controlling engine idle speed at an ignition timing retarded from the base ignition retardation value (e.g., more than five degrees of retardation). This ensures that ignition timing can be both advanced and retarded, to reduce both positive and negative speed errors between measured engine speed and the engine idle speed target. Referring to the torque-time graph of FIG. 7, a torque reserve for ignition timing would enable the ignition timing to be advanced and retarded to modulate the engine output torque between the lower dashed line 702 and the middle dashed line 704, wherein the lower line 702 represents the minimum engine torque achievable when maximum ignition retardation is selected, and wherein the middle dashed line 704 represents the higher minimum engine torque achievable when the base ignition retardation value (most advanced timing) is selected.

A drawback of implementing a torque reserve for ignition timing is that the engine 102 is not operated at its most thermally efficient operating point during engine idling. Aspects of the invention seek to improve thermal efficiency, as explained below with reference to FIGS. 6-7.

Figure 7:
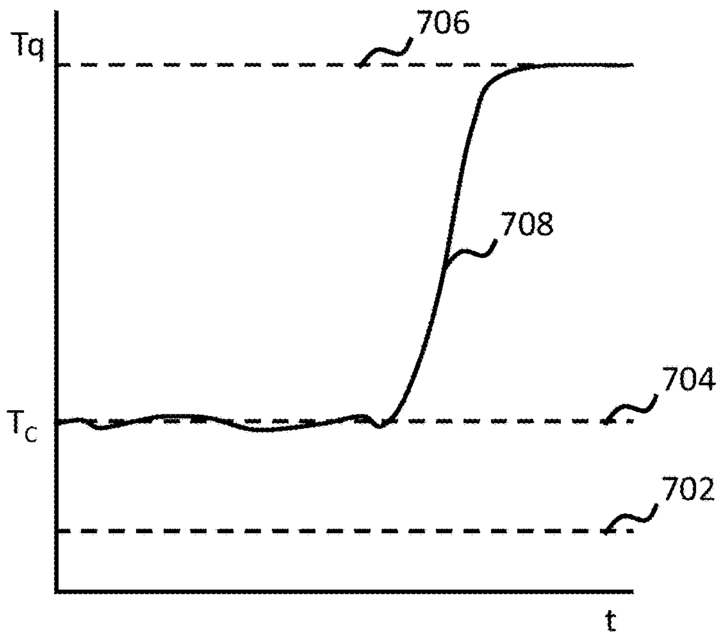
FIG. 7 illustrates an example torque-time graph.

Aspects of the invention, when implemented, reduce or eliminate the need for ignition retardation during engine idling. When certain conditions are met, the base ignition retardation value becomes the new baseline timing (as opposed to a torque reserve ignition timing value). This enables the engine 102 to be controlled at its most thermally efficient operating point during engine idling. As shown in FIG. 7, the engine output torque (signal 708) is now controlled to not fall below the line 704 (engine torque achievable when the base ignition retardation value is selected). Since use of the more thermally efficient base ignition retardation value will often result in engine output torque being too high compared to what is actually needed for engine idle speed control, the electric machine 106 will be controlled to impose a braking/retarding torque by converting the excess engine output torque into electrical energy stored in the electrical energy storage means 110.

Therefore, engine idle speed can be maintained, without wasting energy, by operating the engine 102 with higher thermal efficiency and by converting the resulting excess engine output torque into stored electrical energy.

To minimise the speed error and enforce engine idle speed control, the control system 200 may modulate the retarding torque of the electric machine 106 in dependence on the speed error. This is as fast as advancing or retarding ignition timing, due to the dynamics and low inertia of electric machines. The engine torque is modulated slowly in line with FIG. 7, to provide charging energy for the electric machine 106 to maintain charging power to the electrical energy storage means 110.

Figure 6:
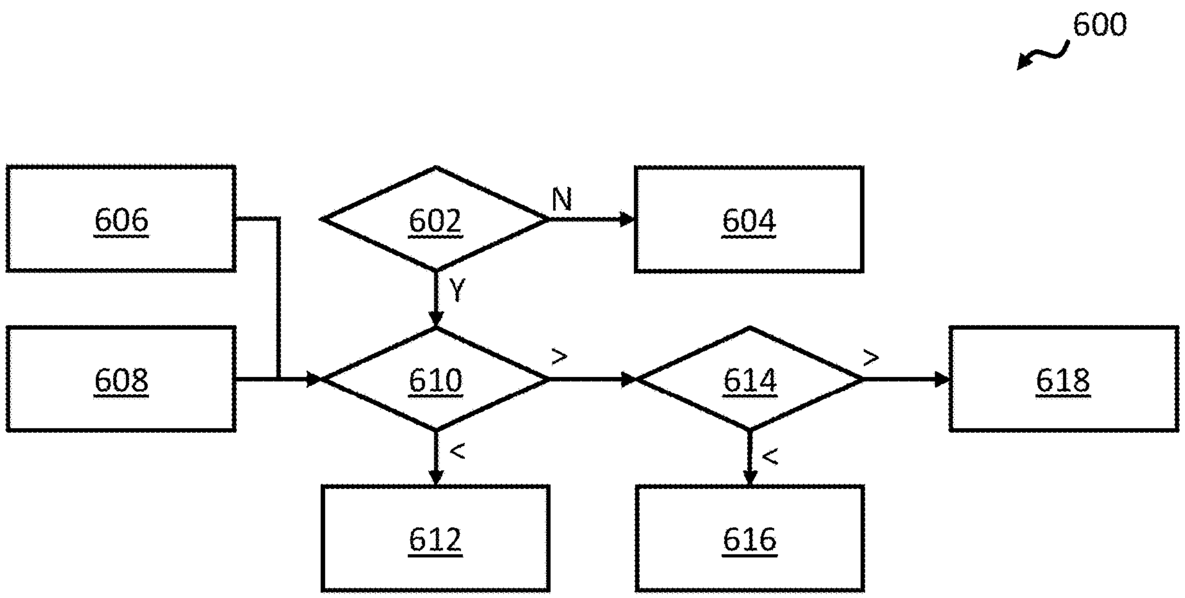
FIG. 6 illustrates an example of a method.

FIG. 6 is a flowchart illustrating an example of a computer-implemented method 600, which can be implemented by the control system 200. The invention can however be implemented in other ways than shown in FIG. 6. It is not essential for all of the blocks of the illustrated method 600 to be executed, or for the blocks to be executed in the exact order shown. Decision block 602 comprises determining whether the electric machine 106 has the capability to be used for engine idle control, so that engine ignition timing can be controlled in the more thermally efficient manner described herein.

If the determination is negative, the method 600 proceeds to block 604 in which a conventional torque reserve for ignition timing is employed by the control system 200. If the determination is positive, the method 600 proceeds to block 610 which enables the electric machine 106 to be used for engine idle speed control so that the more thermally efficient base ignition retardation value can be used for engine ignition timing.

The determination can be dependent on whether a fault indicator is active, indicating that conversion of engine output torque to electrical energy stored in the electrical energy storage means 110 is not possible due to a fault.

Additionally, or alternatively, the determination can be dependent on any one or more of a battery temperature, a state of charge, a state of health, or a power limit, associated with the electrical energy storage means 110.

Examples of a negative determination can include: fault indicator active; temperature below threshold; state of charge above threshold; state of health below threshold; power limit below threshold; etc. Examples of a positive determination include: fault not active; temperature not above threshold; state of charge not above threshold; state of health not below threshold; power limit not below threshold.

Decision block 610 determines an instantaneous torque requirement, and compares the instantaneous torque requirement with a reference engine idling torque. For example, block 610 may determine whether the instantaneous torque requirement is greater than the reference engine idling torque. In practice, this determination affects whether the engine output torque (signal 708) can follow the line 704 (reference engine idling torque) of FIG. 7 or needs to be raised higher than the line 704.

The instantaneous torque requirement comprises the sum of a first input signal (from block 606) indicative of an engine idle torque requirement during engine idling, and a second input signal (from block 608) indicative of an electric machine torque requirement during the engine idling.

The engine idle torque requirement is defined as the powertrain torque required to keep the engine speed at the engine idle speed target. The engine idle torque requirement may be an open loop value. The engine idle torque requirement may be a feedforward value. The engine idle torque requirement may be a torque that is calculated to overcome losses in the engine, transmission, and ancillaries. The engine idle torque requirement may further be calculated to enable a vehicle creep torque to reach the vehicle wheels.

The electric machine torque requirement is defined as comprising a charging requirement for supplying electrical power to one or more electrical consumers such as the electrical energy storage means 110, a heating ventilation or cooling subsystem, a power steering subsystem, or a low voltage subsystem (e.g., 12V). A charging requirement is based on how much instantaneous electrical power is required. The charging requirement can for example be based on a power limit calculated based on information such as the state of charge, temperature and/or state of health of the electrical energy storage means 110. The power limit may be based on hardware limitations of the electrical energy storage means 110, such that damage could occur if it receives electrical power exceeding the power limit.

The sum of the engine idle torque requirement and the charging requirement indicates how much engine torque is currently required (along the y-axis of FIG. 7).

The reference engine idling torque, against which the instantaneous torque requirement is compared, is the torque which an engine airflow model has calculated to be the minimum engine idling torque achievable with use of the base ignition retardation value and a minimum stable engine air charge. The reference is represented by the line 704 in FIG. 7. Although the line 704 in FIG. 7 is straight, the reference engine idling torque that the line represents could vary in dependence on factors such as temperature, pressure altitude, combustion settings (e.g., engine valve modes, fuel injection modes such as multiple/split injections). The engine airflow model may predict engine torque based on in-vehicle sensor data comprising engine airflow measurements, such as lambda, mass air flow (MAF), manifold absolute pressure (MAP), or exhaust air flow/pressure. The engine airflow model may reside within the control system 200 or in an external control system. An advantage of using a reference calculated in this manner is enabling greater thermal efficiency than by using a static reference. However, in an alternative implementation, the reference engine idling torque can be static.

Based on the above examples, an example implementation of block 610 is as follows:

$$\text{engine idle torque requirement } (T_A) + \text{charging requirement } (T_B) > \text{minimum engine idling torque achievable with minimum air change and base ignition retardation value } (T_C) \text{ (line 704)?}$$

If the charging requirement $T_B$ is sufficiently low that the instantaneous torque requirement ($T_A+T_B$) is less than the reference engine idling torque ($T_C$, line 704) in the above equation, the conventional approach would be to request $T_A+T_B$ from the engine 102. However, this would necessitate ignition retardation because any amount of engine torque less than $T_C$ would require at least some ignition retardation. Therefore, according to an aspect of the invention, the method 600 proceeds to block 612 which comprises requesting $T_C$ (the reference engine idling torque with the base ignition retardation value) instead of $T_A+T_B$ (total engine torque actually requested), even though $T_C$ is greater than the total engine torque actually required to satisfy the requests $T_A$ and $T_B$.

By requesting $T_C$, the engine torque is being controlled in a feedforward manner to provide the predicted most thermally efficient torque as determined by the engine airflow model. Meanwhile, to prevent engine speed from rising above an engine idle speed setpoint, the electric machine 106 is controlled to impose a retarding torque on the engine 102 to generate electrical energy for the electrical energy storage means 110, thereby reducing the produced net torque (system torque generated by the powertrain 100) to (or at least towards) what is actually required by the requests $T_A+T_B$. Very little energy is lost—it is merely converted to electrical energy.

If the charging requirement $T_B$ is higher such that $T_A+T_B$ is greater than $T_C$ in the above equation, the method 600 instead proceeds to blocks 614-618 which enable $T_A+T_B$ to be requested from the engine 102, in other words the engine torque is increased to follow the charging requirement. This is represented in FIG. 7 by the engine output torque 708 increasing from the line 704. The base ignition retardation value can be maintained in this period, so the engine 102 produces the additional torque as efficiently as possible.

Therefore, throughout the entire time history of FIG. 7, the base ignition retardation value is used, and the engine torque is never controlled to be less than the line 704 (minimum engine idling torque achievable with minimum air charge and base ignition retardation value) which would necessitate at least some ignition retardation. In practice, ignition timing may be temporarily varied from the base ignition retardation value as required by knock reduction control schemes and/or the like.

In summary, the method 600 enables the engine idle torque requirement to 'sit at' the minimum torque achievable with use of the base ignition retardation value (line 704), when the engine idle torque is not required to be higher to satisfy a charging requirement. Some charging will be requested to ensure that if this torque is more than required, the excess torque is converted to electrical energy. Whenever the charging requirement requires more torque than would be achievable at line 704, the torque requested from the engine is increased to follow the charging requirement to enable greater charging.

To give a numerical example:

$$\text{engine idle torque requirement } (T_A) = +5 \text{ Nm}$$

$$\text{charging requirement } (T_B) = +5 \text{ Nm to enable } -5 \text{ Nm of charging}$$

$$\text{minimum engine idling torque achievable with minimum air change and base ignition retardation value } (T_C) = +15 \text{ Nm}$$

$T_A+T_B<T_C$ (10 Nm<15 Nm), therefore request $T_C$=15 Nm from the engine 102 (with minimum air charge and base ignition retardation value), and request electric machine charging amounting to the originally-requested-5 Nm plus an additional-5 Nm as braking/retarding torque to reduce the net torque to 5 Nm and prevent the engine speed from increasing.

Decision block 614 imposes a condition limiting how high the engine torque is allowed to rise to satisfy the instantaneous torque requirement ($T_A+T_B$). The condition comprises a noise vibration and harshness (NVH) torque limit. An NVH torque limit is advantageous because idling engines can generate vibrations at various torque setpoints, which pass through the engine mounts, transmission mounts, and exhaust, to the vehicle body. In FIG. 7, the NVH torque limit is represented by the top dashed line 706, far above the lines 702 and 704.

In an example, block 614 comprises determining whether the instantaneous torque requirement ($T_A+T_B$) is less than the NVH torque limit. If less than the NVH torque limit, the method 600 proceeds to block 616 which comprises requesting the instantaneous torque requirement ($T_A+T_B$). If greater than the NVH torque limit, the method 600 proceeds to block 618 which comprises modifying the engine output torque towards the NVH torque limit. For example, block 618 may comprise saturating the instantaneous torque requirement at the value of the NVH torque limit.

The NVH torque limit may be a variable. The NVH torque limit may depend on engine idle speed. The engine idle speed can depend on the engine idle speed setpoint which itself can depend on which ancillaries are switched on, and whether the powertrain 100 is in a warmup phase.

Additionally, or alternatively, the NVH torque limit may depend on an engine mode. The engine mode can be any mode that affects NVH. An example of such an engine mode is an engine valve mode for an engine having a variable valve system such as a hydraulic continuously variable valve lift system. The engine valve mode can comprise one or more of: valve closing time; valve opening time; valve opening duration. Different engine valve modes affect the torque level at which NVH increases.

It is to be understood that the or each controller 201 can comprise a control unit or computational device having one or more electronic processors (e.g., a microprocessor, a microcontroller, an application specific integrated circuit (ASIC), etc.), and may comprise a single control unit or computational device, or alternatively different functions of the or each controller 201 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller 201 to implement the control techniques described herein (including some or all of the functionality required for the method 600 described herein). The set of instructions could be embedded in said one or more electronic processors of the controller 201; or alternatively, the set of instructions could be provided as software to be executed in the controller 201. A first controller or control unit may be implemented in software run on one or more processors. One or more other controllers or control units may be implemented in software run on one or more processors, optionally the same one or more processors as the first controller or control unit. Other arrangements are also useful.

In the example illustrated in FIG. 3, the or each controller 201 comprises at least one electronic processor 204 having one or more electrical input(s) 210 for receiving the first and second input signals, and one or more electrical output(s) 212 for outputting the control signal. The or each controller 201 further comprises at least one memory device 206 electrically coupled to the at least one electronic processor 204 and having instructions 208 stored therein. The at least one electronic processor 204 is configured to access the at least one memory device 206 and execute the instructions 208 thereon so as to compare the instantaneous torque requirement with the reference engine idling torque associated with use of the base ignition retardation value.

The, or each, electronic processor 204 may comprise any suitable electronic processor (e.g., a microprocessor, a microcontroller, an ASIC, etc.) that is configured to execute electronic instructions. The, or each, electronic memory device 206 may comprise any suitable memory device and may store a variety of data, information, threshold value(s), lookup tables or other data structures, and/or instructions therein or thereon. In an embodiment, the memory device 206 has information and instructions for software, firmware, programs, algorithms, scripts, applications, etc. stored therein or thereon that may govern all or part of the methodology described herein. The processor, or each, electronic processor 204 may access the memory device 206 and execute and/or use that or those instructions and information to carry out or perform some or all of the functionality and methodology describe herein.

The at least one memory device 206 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

Example controllers 201 have been described comprising at least one electronic processor 204 configured to execute electronic instructions stored within at least one memory device 206, which when executed causes the electronic processor(s) 204 to carry out the method as hereinbefore described. However, it will be appreciated that embodiments of the present invention can be realised in any suitable form of hardware, software or a combination of hardware and software. For example, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

It will be appreciated that various changes and modifications can be made to the present invention without departing from the scope of the present application.

The blocks illustrated in FIG. 6 may represent steps in a method and/or sections of code in the computer program 208. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example, the second input signal could be indicative of a different torque requirement than a charging requirement.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control system for controlling an engine and an electric machine of a vehicle, the control system comprising one or more controllers, the control system configured to:

receive a first input signal indicative of an engine idle torque requirement during engine idling;

compare an instantaneous torque requirement with a reference engine idling torque associated with use of a base ignition retardation value; and output a control signal to control output torque of the engine in dependence on the comparison, wherein if the instantaneous torque requirement is less than the reference engine idling torque, the control signal requests the reference engine idling torque with the base ignition retardation value, and the control system is configured to control the electric machine to impose a retarding torque on the engine to generate electrical energy, thereby reducing a net torque, wherein the reference engine idling torque is a minimum idling torque achievable with use of the base ignition retardation value.

2. The control system of claim 1, wherein the control system is configured to receive a second input signal indicative of an electric machine torque requirement during the engine idling, and wherein the instantaneous torque requirement is based on the first input signal and the second input signal.

3. The control system of claim 1, wherein the base ignition retardation value is a value selected from the range zero to five degrees of ignition retardation.

4. The control system of claim 1, wherein the reference engine idling torque is a minimum idling torque achievable with use of a minimum engine air charge and the base ignition retardation value.

5. The control system of claim 1, wherein the reference engine idling torque is a modelled value based on in-vehicle sensor data.

6. The control system of claim 5, wherein the modelled value is from an engine airflow model, and wherein the in-vehicle sensor data comprises engine airflow measurements.

7. The control system of claim 1, wherein when the instantaneous torque requirement is greater than the reference engine idling torque, the control signal requests more torque than the reference engine idling torque.

8. The control system of claim 7, wherein requesting more torque than the reference engine idling torque comprises requesting the instantaneous torque requirement.

9. The control system of claim 8, wherein requesting more torque than the reference engine idling torque comprises requesting the instantaneous torque requirement if a noise vibration and harshness, NVH, condition is satisfied.

10. The control system of claim 9, wherein the NVH condition comprises a noise vibration and harshness, NVH, torque limit, wherein the NVH torque limit is dependent on engine speed and/or wherein the NVH torque limit is dependent on an engine mode.

11. The control system of claim 9, wherein if the instantaneous torque requirement exceeds the NVH torque limit, the control signal to control output torque of the engine is modified towards the NVH torque limit.

12. A vehicle comprising the control system of claim 1.

13. A method of controlling an engine and an electric machine of a vehicle, the method comprising:

receiving a first input signal indicative of an engine idle torque requirement during engine idling;

comparing an instantaneous torque requirement with a reference engine idling torque associated with use of a base ignition retardation value; and outputting a control signal to control output torque of the engine in dependence on the comparison, wherein if the instantaneous torque requirement is less than the reference engine idling torque, the control signal requests the reference engine idling torque with the base ignition retardation value, and controlling the electric machine to impose a retarding torque on the engine to generate electrical energy, thereby reducing a net torque, wherein the reference engine idling torque is a minimum idling torque achievable with use of the base ignition retardation value.

14. A non-transitory, computer-readable medium having stored thereon software that, when executed, is arranged to perform the method according to claim 13.

* * * * *